P. H. Wait,
Spoke Lathe.
No. 13,511. Patented Aug. 28, 1855.
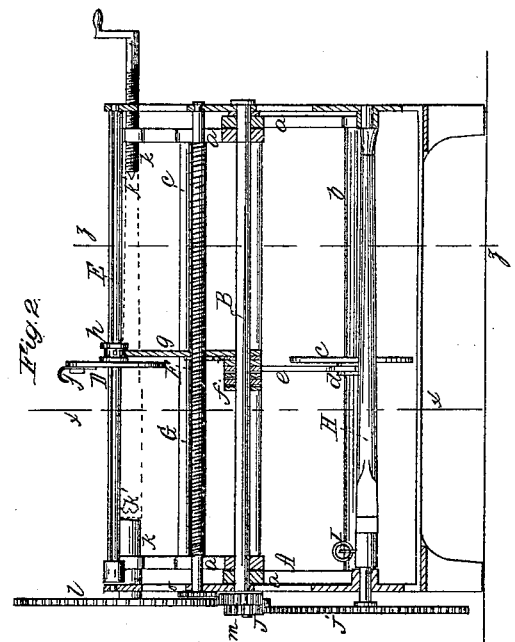
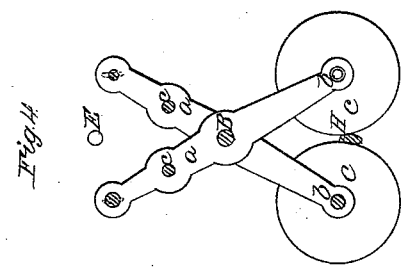
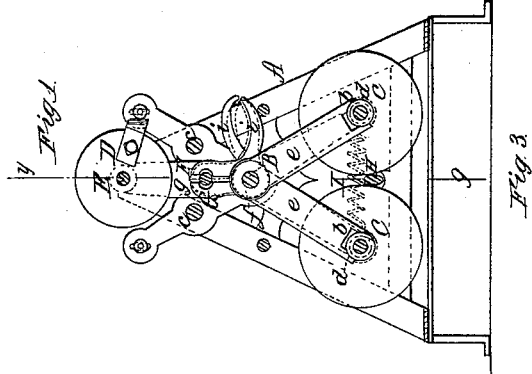
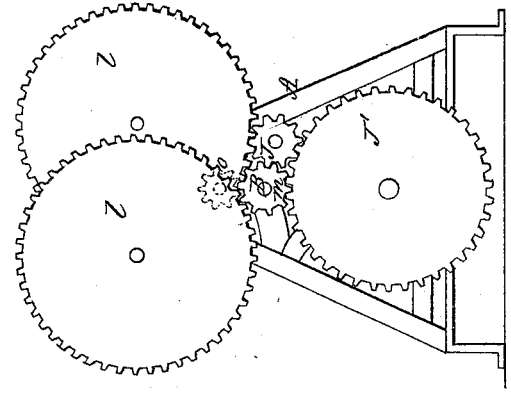

UNITED STATES PATENT OFFICE.

P. H. WAIT, OF BARKERSVILLE, NEW YORK.

MACHINE FOR CUTTING IRREGULAR FORMS.

Specification of Letters Patent No. 13,511, dated August 28, 1855.

*To all whom it may concern:*

Be it known that I, P. H. WAIT, of Barkersville, in the county of Saratoga and State of New York, have invented a new and Improved Machine for Cutting or Turning Irregular Formed Articles, Such as Spokes, Ax-Helves, &c.; and I do hereby declare that the following is a full, clear, and exact description of the same, reference being had to the annexed drawings, making a part of this specification, in which—

Figure 1, is a transverse vertical section of my improvement, $x$, $x$, Fig. 2, showing the plane of section. Fig. 2, is a longitudinal vertical section of same, $y$, $y$, Fig. 1, shows the plane of section. Fig. 3, is an end view of the same. Fig. 4, is a detached transverse section of the two vibrating oscillating frames $z$, $z$, Fig. 2, shows the plane of section.

Similar letters of reference indicate corresponding parts in the several figures.

The nature of my invention consists in the employment or use of two vibrating or oscillating frames which are hung upon one and the same shaft, the lower ends of the frames having sliding rollers upon them between which rollers the pattern rotates and operates the frames which have the "stuff" to be operated upon centered at their upper parts. The rollers and disk to which the cutters are attached are moved by a screw rod as will be presently shown, so that the whole length of the "stuff" will be properly presented to the action of the cutters, and the "stuff" cut or turned in form corresponding to the pattern.

To enable others skilled in the art to make and use my invention, I will proceed to describe its construction and operation.

A, represents a framing constructed in any proper manner to support the working parts.

B, is a rod or shaft placed longitudinally in the framing A, and upon which two frames work. These frames are each formed of two end pieces, $a$, $a$, through the centers of which the rod or shaft B, passes, and the lower ends of the end pieces, $a$, of each frame have a rod, $b$, attached to them and the upper parts of the end pieces about midway between their centers and ends have rods, $c$, attached to them. The frames cross each other as clearly shown in Figs. 1 and 4.

Upon the rods, $b$, at the lower parts of the frames there are placed loosely rollers or disks C, C, one upon each rod. Each roller or disk is provided with a collar or flanch, $d$, around which the lower end of an arm, $e$, fits. The upper ends of these arms are attached to a collar, $f$, which is fitted loosely on the rod or shaft B, and an upright arm, $g$, is also attached to this collar, the upper end of which arm is fitted around a collar or flanch, $h$, attached to the center of a cutter disk D, which is fitted loosely on a shaft E, which works in suitable bearings upon the upper part of the framing A. The cutter disk is made to rotate with the shaft E, by means of a feather and groove, but at the same time is allowed to slide longitudinally upon it.

F, represents a nut which is formed of two parts provided with shanks, $i$, $i$, which work upon the rod or shaft B, and are attached to or move with the collar, $f$. The two parts of the nut F, are fitted to a screw-rod or shaft G, placed longitudinally in the framing A. The nut may be made to embrace the screw rod or shaft or be disconnected from it by moving the shanks, $i$, $i$, see Fig. 1.

H, represents the pattern which is made of a form corresponding to the desired form in which the "stuff" is to be cut or turned. The pattern is secured between centers or its ends are allowed to turn freely in the lower part of the framing A, and the two rollers or disks C, C, bear upon opposite sides of the pattern which is between them, as shown clearly in Figs. 1 and 4.

I, is a spring the ends of which are attached to the rods $b$, see Figs. 1 and 2. This spring keeps the rollers and disks against the pattern.

The disk D, has one or more cutters $j$, attached to it of gouge or other proper form. The upper ends of the end pieces, $a$, $a$, have rods $k$, passing through them, to the inner ends of which there are center points $k'$, attached between which the "stuff" to be operated upon is centered. The rods $k$, which pass through the outer end pieces have screw threads cut upon them, and the rods which pass through the opposite end pieces have gear wheels $l$, $l$, on their outer ends, both of which gear into a pinion, $m$, hung on a small hollow shaft $n$, which encompasses the end of the rod or shaft B. The screw rod or shaft G, also has a pinion, $o$, on one end, which pinion also gears into the pinion, $m$.

J, is a pinion which gears into the pinion $m$, and the pinion J, gears into a toothed wheel J', on one end of the pattern H, See Figs. 2 and 3.

Operation: The "stuff" shown in red Figs. 1 and 2, is properly "roughed off" and secured between the center points, $k'$, a piece of "stuff" being at the upper part of each frame. The cutter disk D, and rollers or disks C, C, are then moved toward one end of the frames. Motion is then given the small shaft, $n$, and pinion, $m$, in any proper manner, and motion is also given the shaft E, by a belt on by gearing. The pinion, $m$, gives a rotary motion to the two pieces of stuff, screw rod or shaft G, and pattern H, and the screw rod or shaft G, as it rotates slides the rollers or disks C, and cutter disk D, along on their respective rods or shafts in consequence of the nut F, and as the rollers or disks C, bear against the pattern in consequence of the spring I, the pattern as it rotates will force outward and give a vibrating or oscillating motion to the frames, and the "stuff" at the upper ends of the frames will be moved in a corresponding manner toward and from the cutter disk D, and as the cutter disk and rollers move along the "stuff" will be cut or turned in form corresponding to the pattern.

By the above invention the pattern is prevented from springing as it rotates in consequence of the rollers or disks bearing against it at opposite sides. And it possesses the advantage of doing double work or turning or cutting two articles at once, or at the same time, the machine therefore works rapidly and well.

I do not claim the pattern H, or the means of turning irregular formed articles by means of a pattern for this has been been previously done in various ways, but

What I claim as new and desire to secure by Letters Patent, is,

The employment or use of two vibrating or oscillating frames placed upon a rod or shaft B, and operated by means of the pattern H, bearing against the sliding rollers or disks C, said pattern as it rotates moving the "stuff" at the upper parts of the frames toward and from the cutter disk D. The cutter disk and rollers or disks being moved by means of the screw rod or shaft G, and nut F, substantially as herein shown for the purpose set forth.

P. H. WAIT.

Witnesses:
 LATHAM COFFIN,
 NATHAN E. PACKER.